United States Patent
Chen et al.

(10) Patent No.: US 10,624,026 B2
(45) Date of Patent: Apr. 14, 2020

(54) METHOD FOR CONSIDERABLY ENHANCING THE AVAILABILITY OF WIRELESS CONNECTIONS

(71) Applicant: Airbus Operations GmbH, Hamburg (DE)

(72) Inventors: Bing Chen, Hamburg (DE); Heiko Trusch, Hamburg (DE); Martin Kubisch, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 14/267,609

(22) Filed: May 1, 2014

(65) Prior Publication Data
US 2014/0323170 A1 Oct. 30, 2014

Related U.S. Application Data

(63) Continuation of application No. PCT/EP2012/004573, filed on Nov. 2, 2012.
(Continued)

(30) Foreign Application Priority Data

Nov. 4, 2011 (DE) .................. 10 2011 118 076

(51) Int. Cl.
*H04W 48/20* (2009.01)
*H04W 36/18* (2009.01)
(Continued)

(52) U.S. Cl.
CPC ........... *H04W 48/20* (2013.01); *H04W 36/08* (2013.01); *H04W 36/18* (2013.01); *H04W 36/36* (2013.01);
(Continued)

(58) Field of Classification Search
CPC .. B64D 11/0015; B64D 11/0624; H04B 1/74; H04B 7/022; H04B 7/024; H04B 7/026;
(Continued)

(56) References Cited

U.S. PATENT DOCUMENTS 5,880,868 A 3/1999 Mahany
6,055,428 A 4/2000 Soliman
(Continued)

FOREIGN PATENT DOCUMENTS

CN 102143557 A 8/2011
EP 1601136 11/2005
(Continued)

OTHER PUBLICATIONS

Y. Zhu, Q. Zhang, Z. Niu, and J. Zhu, "improve Transmission Reliability with Multi-AP Diversity in Wireless Networks: Architecture and Performance Analysis", QShine'06,Waterloo, Ontorio, Canada, Aug. 7-9, 2006; pp. 1-4.*
(Continued)

*Primary Examiner* — Yuwen Pan
*Assistant Examiner* — Paul P Tran
(74) *Attorney, Agent, or Firm* — Greer, Burns & Crain, Ltd.

(57) ABSTRACT

A control unit and a method for controlling a wireless data transmission between a wireless terminal and access points of a communications network in a transportation device, as well as a computer program for executing the method. The wireless terminal is assigned to two or more of the access points in such a way that one communications channel is available between the wireless terminal and the access points for wireless data transmission between the wireless terminal and the access points. A control unit is used, in the case of transmission from the access points towards the wireless terminal, to select at least one of the access points
(Continued)

for wireless transmission to the terminal and/or in the case of transmission from the terminal towards the access points, to determine a message for further use in the communications network based on the messages received from the terminal by the access points.

14 Claims, 10 Drawing Sheets

Related U.S. Application Data

(60) Provisional application No. 61/555,521, filed on Nov. 4, 2011.

(51) Int. Cl.
| | | |
|---|---|---|
| *H04W 36/08* | (2009.01) | |
| *H04W 36/36* | (2009.01) | |
| H04W 28/16 | (2009.01) | |
| H04W 84/00 | (2009.01) | |
| H04W 88/12 | (2009.01) | |

(52) U.S. Cl.
CPC ......... *H04W 28/16* (2013.01); *H04W 84/005* (2013.01); *H04W 88/12* (2013.01)

(58) Field of Classification Search
CPC .. H04B 7/0413; H04B 7/0434; H04B 7/0632; H04B 7/068; H04B 7/08; H04B 7/0854; H04B 7/0874; H04B 17/309; H04B 17/382; H04L 1/1854; H04L 1/1861; H04L 5/0007; H04L 5/0032; H04L 5/0035; H04L 5/0053; H04L 5/0055; H04L 5/006; H04L 5/0062; H04L 5/0073; H04L 63/068; H04L 1/1812; H04L 1/1819; H04L 1/1822; H04L 1/1829; H04L 1/1896; H04L 5/0016; H04L 5/0023; H04L 5/0037; H04L 5/0048; H04L 5/0057; H04L 5/0069; H04L 5/0091; H04L 5/0098; H04L 5/023; H04L 27/2646; H04L 27/2657; H04L 27/2675; H04L 27/2695; H04Q 9/00; H04W 16/18; H04W 48/12; H04W 36/02; H04W 36/18; H04W 36/30; H04W 36/32; H04W 48/20; H04W 52/40; H04W 72/082; H04W 36/08; H04W 36/36; H04W 28/16; H04W 84/005; H04W 88/12; H04W 24/02; H04W 24/10; H04W 36/0055; H04W 52/143; H04W 52/24; H04W 72/0426; H04W 72/044; H04W 72/0473; H04W 72/085; H04W 72/1289; H04W 76/02
USPC ......... 455/418, 431, 435.1, 435.2, 436, 437, 455/450, 501, 525; 370/252, 277, 328, 370/329, 331, 338; 381/86; 398/115
See application file for complete search history.

(56) References Cited

U.S. PATENT DOCUMENTS

| | | | |
|---|---|---|---|
| 7,760,699 B1 | 7/2010 | Malik | |
| 8,483,292 B2* | 7/2013 | Wang | H04B 7/024 375/219 |
| 2002/0160773 A1* | 10/2002 | Gresham | B64D 11/0015 455/431 |
| 2004/0248581 A1* | 12/2004 | Seki | H04B 7/022 455/450 |
| 2005/0157658 A1* | 7/2005 | Ishii | H04W 48/12 370/252 |
| 2005/0259619 A1 | 11/2005 | Boettle et al. | |
| 2006/0018207 A1 | 1/2006 | Saito | |
| 2006/0217111 A1 | 9/2006 | Bosch et al. | |
| 2006/0221895 A1* | 10/2006 | Mori | H04B 7/18506 370/328 |
| 2007/0049280 A1* | 3/2007 | Sambhwani | H04W 36/18 455/442 |
| 2007/0217622 A1 | 9/2007 | Takeuchi et al. | |
| 2008/0122273 A1* | 5/2008 | Reitmann | B64D 11/0624 297/217.3 |
| 2008/0254799 A1* | 10/2008 | Yahagi | H04B 7/022 455/436 |
| 2009/0109939 A1* | 4/2009 | Bhushan | H04W 72/082 370/337 |
| 2010/0087148 A1* | 4/2010 | Srinivasan | H04W 16/08 455/63.1 |
| 2010/0103821 A1* | 4/2010 | Palanki | H04L 5/0035 370/241 |
| 2010/0182977 A1* | 7/2010 | Watanabe | H04N 5/4401 370/331 |
| 2011/0038329 A1 | 2/2011 | Luo et al. | |
| 2011/0080879 A1* | 4/2011 | Grant | H04B 7/024 370/329 |
| 2011/0222522 A1 | 9/2011 | Akil et al. | |
| 2011/0299470 A1 | 12/2011 | Mueller et al. | |
| 2012/0002611 A1* | 1/2012 | You | H04B 7/024 370/328 |
| 2012/0046026 A1* | 2/2012 | Chande | H04W 24/10 455/422.1 |
| 2012/0207077 A1* | 8/2012 | Iwai | H04B 7/024 370/312 |
| 2012/0294200 A1* | 11/2012 | Wang | H04W 76/02 370/277 |
| 2013/0201896 A1* | 8/2013 | Ono | H04B 7/024 370/312 |

FOREIGN PATENT DOCUMENTS

| | | |
|---|---|---|
| EP | 1835662 | 9/2007 |
| EP | 2039583 | 3/2009 |
| EP | 2365643 | 9/2011 |
| WO | 9904593 | 1/1999 |
| WO | 2010092152 | 8/2010 |
| WO | 2011014840 | 2/2011 |

OTHER PUBLICATIONS

International Search Report, dated Dec. 17, 2012.
Distributed Physical Carrier Sensing Adaptation Scheme in Cooperative MAP WLAN, IEEE_Hua, Nov. 2009.
A Multi-AP Architecture for High-Density WLANs: Protocol Design and Experimental Evaluation, IEEE—Zhu, Jun. 2008.
Chinese Office Action, dated Mar. 3, 2017.
German Office Action for corresponding German Patent Application No. 10 2011 118 076.5.

* cited by examiner

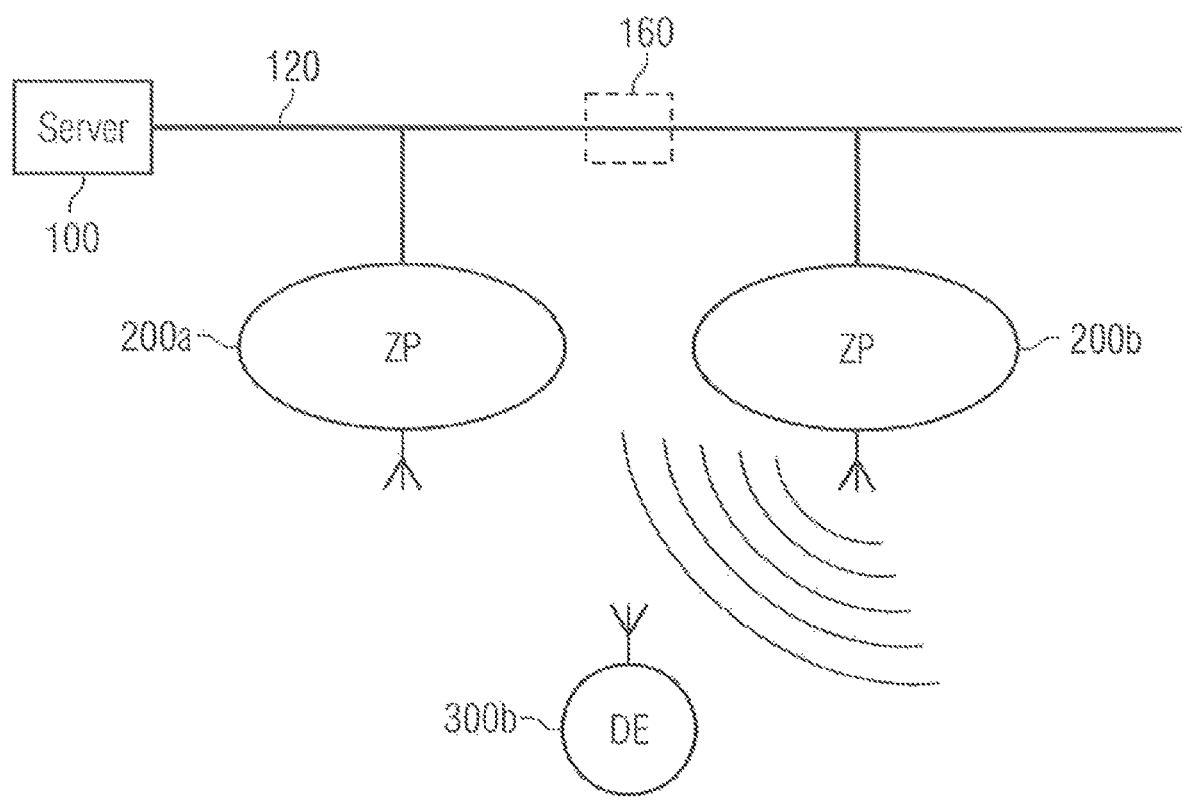

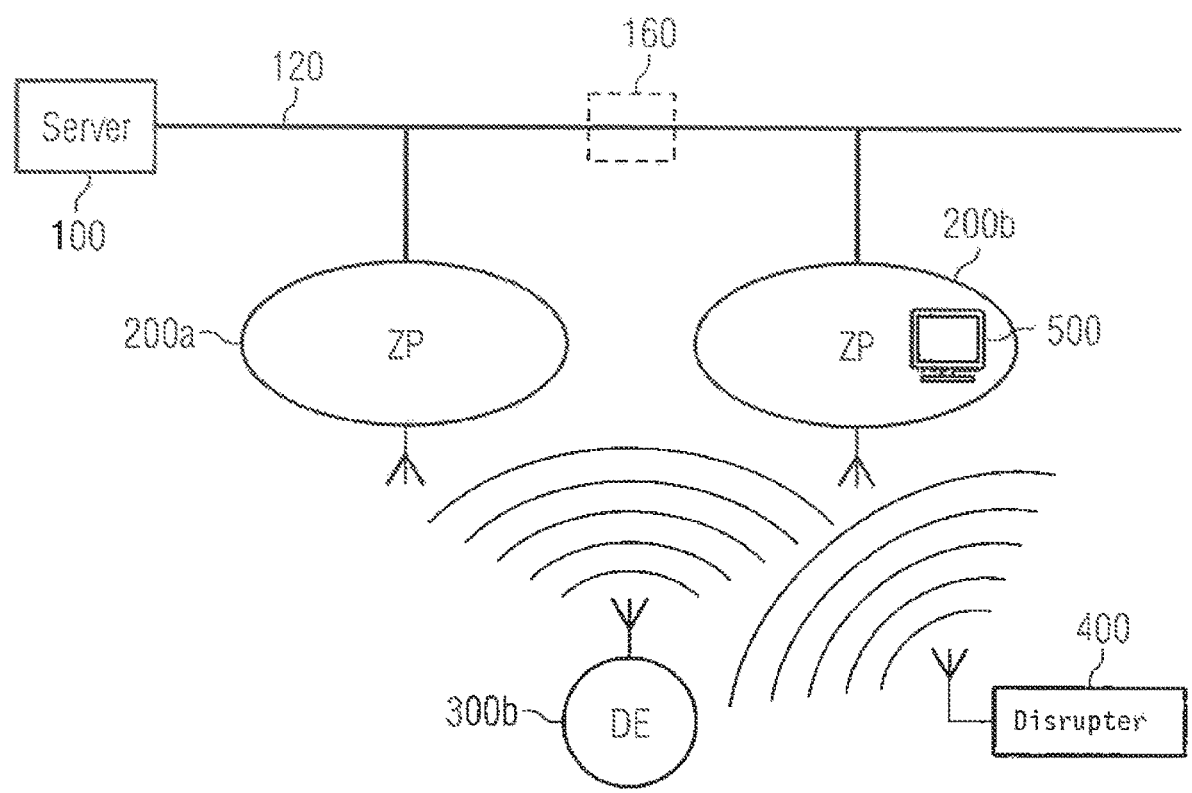

METHOD FOR CONSIDERABLY ENHANCING THE AVAILABILITY OF WIRELESS CONNECTIONS

CROSS-REFERENCES TO RELATED APPLICATIONS

This application is a continuation of International Application PCT/EP2012/004573 filed Nov. 2, 1012, designating the United States and published on May 10, 2013 as WO 2013/064263. This application also claims the benefit of the U.S. Provisional Application No. 61/555,521, filed on Nov. 4, 2011, and of the German patent application No. 10 2011 118 076.5, filed on Nov. 4, 2011, the entire disclosures of which are incorporated herein by way of reference.

BACKGROUND OF THE INVENTION

The present invention relates to a control unit and a method for controlling a wireless data transmission between a wireless terminal and access points of a communications network provided in a means of transport, particularly in an aircraft, as well as a computer program for performing the method.

The planned use of wireless communications networks (also referred to as wireless communications networks) to connect electronic devices to one another in means of transport such as, for example, aircraft, ships, buses, or trains, is increasing. These electronic devices (often referred to as electronic terminals in the context of wireless communications) include, among other things, sensors, indicator elements such as warning and control lights, displays (for example, for "in-flight entertainment"), and actuators (such as electrical motors, light fixtures and illumination systems) as well as devices that record and process and/or store data (for example, data recorders or control units). In order to guarantee the reliable transfer of information between the network components of the communications network, for example, between the electronic devices themselves or between a central network component such as a central computer or server unit, and the electronic devices, it is important to take any interference that may arise into account.

The use of parallel cable connection is known in wireline communications networks for preventing disruptive influences. The necessary degree of reliability is achieved by a sufficient number of redundant connections. In general wireless communications networks, it is known to use a plurality of antennas that are slightly spatially offset in order to achieve a higher data rate or a lower error rate in data transmission to a mobile terminal. Moreover, transmission systems are known that repeat faulty data transmissions with a time delay with antennas that are located at a distance from one another or using different frequencies. In new fourth-generation (Long Term Evolution (LTE)) mobile communications networks, mobile telephones are able to maintain a data connection to multiple base stations, at least temporarily, in order to select the better connection or to improve the data rate.

SUMMARY OF THE INVENTION

One object of the present invention is to provide a control unit and a method for controlling a wireless data transmission between a wireless terminal and access points of a communications network provided in a means of transportation, in particular in an aircraft, and a computer program for performing the method, by means of which reliable communication is guaranteed in the communications network.

According to the present invention, a control unit is provided for controlling a wireless data transmission between a wireless terminal and access points of a communications network provided in a means of transportation, in particular in an aircraft. The wireless terminal is assigned to two or more of the access points in such a way that a communications channel for wireless data transmission is respectively available between the wireless terminal and the two or more access points. In the case of a data transmission from the two or more access points in the direction of the wireless terminal, the control unit is configured to select at least one, in particular exactly one, of the two or more access points for the data transmission to the wireless terminal. Alternatively or additionally, the control unit is configured to determine, in the case of a data transmission from the wireless terminal in the direction of the two or more access points, a message to be further used in the communications network based on messages received by the two or more access points from the wireless terminal.

Interference and noise components of various origins usually act on a wireless communications channel and influence it. Therefore, such interference is also able to affect communications channels between the wireless terminal and the two or more access points. The influence on the communications channels may be caused by reflective properties of the surrounding area (for example, walls, doors, equipment such as beverage carts, or the like), i.e., passive interference, and/or by active transmissions by devices (for example, microwaves, electronic devices belonging to passengers, jammers). At least some of these influences may be dependent upon location, i.e., have a stronger effect on one communications channel than on another. The use of the plurality of separate communications channels between the wireless terminal and the two or more access points for data transmission at least considerably reduces, if not completely neutralizes, the disruptive influences, in particular the disruptive influences that do not work on all usable communications channels or do not work equally on all usable communications channels.

By selecting at least one, in particular exactly one, of the two or more access points for the data transmission to the wireless terminal, in the case of a data transmission from the two or more access points in the direction of the wireless terminal, for example, one or more access points may be selected whose communications channels to the wireless terminal have the fewest disruptions. This neutralizes, or at least weakens, interference acting on the channel or channels that were not selected. By detecting a message to be used further, in the case of a data transmission from the wireless terminal in the direction of the two or more access points, based on the messages received by two or more access points from the wireless terminal, it is possible, for example, to determine a message that corresponds to the message transmitted as exactly as possible, if not even completely correctly. This also neutralizes, or at least weakens, interference acting on one or more channels.

The wireless communications network (communications network) may be any conceivable type of network for the wireless networking of electronic devices (electronic terminals) in a means of transportation, such as an aircraft, in particular a wireless radio communications network. In the wireless communications network, at least some of the network components (also referred to as network elements or network nodes) communicate with one another in a wireless fashion; additionally or alternatively, however, some of the network components may communicate with one another over a wired connection as well. Thus, one or more network components, such as one or more central computing units (for example, one or more central control computers, such as servers) of the communications network may communicate with one another in a wired fashion (for example, via a data bus) to other network components such as, for example, access points, which in turn are connected in a wireless fashion to additional network components such as wireless terminals. The network components in the communications network may include, for example, a plurality of access points, a plurality of wireless terminals, and one or more central computing units such as servers. The one or more computing units such as the one or more central servers, may be connected to the plurality of access points in a wired fashion via a (main) data bus.

At least one subset of the plurality of wireless terminals, for example, all wireless terminals, is respectively assigned to two or more of the plurality of access points, such that a communications channel for wireless data transmission between the wireless terminal and the two or more access points is available between each of this subset of wireless terminals and the two or more access points. In this context, the term "between" the wireless terminal and the two or more access points is not to be understood as having any preferred directional connotation; rather only that, independently of the direction, a communications channel (also referred to as a transmission channel) is respectively present between the wireless terminal and the two or more access points. This means that, "between" each wireless terminal and the two or more access points, a communications channel is generally present for the transmission of data from the wireless terminal in the direction of the two or more access points (this transmission direction is usually referred to as "uplink" in communications terminology) as well as a communications channel for the transmission of data from the two or more access points in the direction of the wireless terminal (this transmission direction is usually referred to as "downlink" in communications terminology).

For example, the communications network may be a local radio network such as a wireless local area network (WLAN), also referred to as "Wi-Fi" in some countries, such as the U.S. This network may, for example, operate in accordance with the standard IEEE-802.11

The access points may create the transition from, for example, the wire-connected (main) data bus (which connects the one or more computer units to the plurality of access points) to the wireless terminals. The one or more central computing units (e.g., control computers/servers) are, in particular, the network components on which applications run that require connection to the terminals or to which the terminals want access. Alternatively or additionally, the one or more central computing units may realize connection queries from other devices/terminals or other applications via the network.

The wireless terminals may be, for example, sensors, actuators, sensor nodes, or other electronic devices that are able to communicate in a wireless fashion with the access points and thus with the one or more control units (for example, server(s)). All sensors and/or actuators conventionally connected via wired communication may be connected in a wireless fashion into the communications network described here. The following are mentioned here purely by way of example: temperature sensors, pressure sensors, proximity switches, RPM sensors, airflow meters, positioning devices, electrical motors, light fixtures, and illumination systems, or data-processing devices (such as, for example, computers, control units, data recorders, or the like). The wireless terminals, for example, the sensors, actuators, sensor nodes, or electronic devices may also communicate via the one or more control units to other wireless terminals, for example, other sensors, actuators, sensor nodes, or other electronic devices. The sensor nodes are particularly designed to query their surroundings by means of one or more sensors and forward the information, for example, to the central processing unit or other sensor nodes.

As mentioned above, preferably at least a subset (i.e., one or more), or all, for example, of the wireless terminals disposed in the communications network is respectively assigned to at least two access points (associated with at least two access points). Even if the text below refers to only one of such a subset of wireless terminals, this applies accordingly for all of the other terminals of the subset as well.

In the case of data transmission from the two or more access points in the direction of the wireless terminal (i.e., in the downlink direction), the control unit is configured to select at least one, in particular exactly one, access point of the two or more access points for wireless data transmission to the wireless terminal. In other words, the control unit is configured to select a subset (for example, one or more than one) or all of the plurality (for example, two, three, four, or more) of access points available for data transmission. According to one possible implementation, the at least one access point out of the plurality of access points may be selected in advance, i.e., for example, be prespecified at the beginning and used for data transmission. According to a refinement of this possible implementation, at least one other access point may be selected as needed instead of the preselected at least one access point. Thus, it is possible, for example, for the two or more access points that are assigned to a wireless terminal to be initially preselected for data transmission in the downlink direction to said wireless terminal. Subsequently, if needed, at least one of the two or more access points may be selected. The implementation discussed above may be described as a two-stage process in which the access points assigned to the mobile terminal may be first preselected (initialized) for data transmission and subsequently, if needed, at least one of the originally preselected access points may be selected. However, the two-stage process mentioned above should be viewed as optional and, as an alternative, at least one, in particular exactly one, of the access points assigned to the mobile terminal may be selected for data transmission using a single-stage process.

Preferably, in the case of transmission in the downlink direction, the control unit may be configured to select an access point from the two or more access points based on information regarding the respective transmission channel (communications channel) between the two or more access points and the wireless terminal for the transmission of a message from the selected access point to the wireless terminal. In particular, information is taken into account for this purpose that specify the transmission channel in the downlink direction; however, information may also be used that characterize the transmission channel in the uplink direction or in the uplink and downlink directions.

Alternatively or additionally, in case of data transmission from the wireless terminal in the direction of the two or more access points (i.e., in the uplink direction), the control unit is configured to determine a message to be further used in the communications network, for example, a message to be forwarded to the one or more computing units or to one or more other wireless terminals, based on messages received by the two or more access points from the wireless terminal. When the wireless terminal transmits a message in uplink direction to the two or more access points assigned to said terminal, the control unit may, according to various variants, determine the message to be further used in the communications network. Both received messages are identical as long as no transmission errors have occurred. However, if an error occurs in transmission on one or more of the communications channels from the wireless terminal to the two or more access points, the messages received will deviate not only from the original message, but also, if possible, from one another.

According to a first variant, the control unit may be configured to decide with reference to a first metric which of the messages received from the two or more access points should be further used, for example, forwarded to the central computing unit. The control unit may, in accordance with the first variant, by means of the first metric, select one of the received messages as provisionally (probably) correct and further use it. If the received messages are identical, provision may also be made in the first metric for one of the received messages in such a case to be selected at random and further used in the communications network. Alternatively, in the case of identical messages, all (identical) received messages may be further used instead of one (randomly) selected message. The decision may also be made with the aid of the first metric, for example, by evaluating checksums (for example, as cyclic redundancy checks (CRCs)) and/or by evaluating error correction parameters (for example, soft decision values of the error correction decoder). According to a second variant, the control unit may be configured to combine the received messages with one another according to a second metric in such a way that the combination results in the correct (originally sent or to be received in the case of correct transmission) message with at least a high degree of probability. According to the second variant, the messages may even be successfully reconstructed or determined if all (for example, both) of the received messages contain errors, for example, different errors.

In order to implement the first and/or second metric, the control unit may comprise a logic unit. The control unit may be disposed, contained, or configured per se in the one or more central computing units connected to the two or more access points in a wired fashion. Alternatively or additionally, it is also possible for the control unit to be disposed in a decentralized fashion between two or more access points, for example, the two or more access points receiving the messages. Moreover, it is also possible to configure the control unit as logical components and distribute the logical components over the access points (for example, contained in the access points).

Furthermore, the present invention also provides for a method for controlling a wireless data transmission between a wireless terminal and access points of a communications network provided in a means of transportation, in particular an aircraft. The wireless terminal is assigned to two or more of the access points in such a way that a communications channel is respectively available between the wireless terminal and the two or more access points for wireless data transmission between the wireless terminal and the two or more access points. In the method according to the invention, in the case of a data transmission from the two or more access points in the direction of the wireless terminal (i.e., in the downlink direction), at least one, in particular exactly one, of the two or more access points is selected by means of a control unit for the wireless data transmission to the wireless terminal. Alternatively or additionally, in the case of data transmission from the wireless terminal in the direction of the two or more access points (i.e., in the uplink direction), a message to be further used in the communications network is determined by means of the control unit based on messages received by the two or more access points from the wireless terminal.

The association between the wireless terminal and the two or more access points may be specified in a fixed (unchangeable) fashion such as, for example, fixed by design or a fixed configuration. Some or all of the associations (assignments) may also be changeable, for example, dynamically selected or modified during operation. Thus, it is conceivable for at least some of the associations to be prespecified at the beginning and for at least a subset of the prespecified assignments to be changed during the operation of the network. The initial presets and/or the changes during operation may be conducted or at least initiated by the control unit.

In the case of data transmission from the two or more access points in the direction of the wireless terminal (downlink), the following steps may be carried out by the method. First, by means of the control unit, an access point responsible for the data transmission may be selected from the two or more access points available for selection based on information regarding the respective transmission channels between the two or more access points and the wireless terminal. After selection, a message may be transmitted from the selected access point to the wireless terminal. The information regarding the respective transmission channels between the two or more access points and the wireless terminal that is used to select the access point may be derived from many various kinds of information and, in particular, relate to the respective transmission channel in the downlink direction, i.e., from the two or more access points to the wireless terminal. For example, this information may be derived from regular data transmissions previously made between the two or more access points and the wireless terminal and/or at least one channel measurement or channel evaluation previously made between the two or more access points and the wireless terminal and/or the current load in the communications network. Alternatively to the selection of the access point based on information regarding the respective transmission channel between the two or more access points and the wireless terminal, the selection of the access point from the two or more access points may also occur randomly (by chance).

Preferably, in the case of a failed transmission of the message from the selected access point to the wireless terminal, the step of selecting the access point is performed again (repeated). By repeating the selection step, the same or another of the two or more access points may be selected for the subsequent transmission of the message.

In the case of data transmission from the wireless terminal in the direction of the two or more access points (i.e., in the uplink direction), the method may comprise the following steps. First, a message may be transmitted from the wireless terminal to a plurality, for example, to all, of the two or more access points, which is then received by the two or more access points. Based on the messages received from the wireless terminal by the two or more access points (for example, by evaluating the received messages), the message to be further used in the communications network, for example, a message to be forwarded to the control unit or to other terminals, may be determined, for example, derived from the two or more received messages.

According to a first variant, it is conceivable for characteristics of the messages received by the two or more access points from the wireless terminal to be compared to a predetermined first metric. Based on the comparison to the predetermined first metric, one of the messages received by the two or more access points from the wireless terminal may be selected as the message to be further used in the communications network. For example, the message whose characteristics coincide more closely with the predetermined first metric may be selected out of the messages received by the two or more access points. The predetermined metric may specify, for example, the appearance of the correct message. If the messages are all correctly received by the two or more access points, the first metric may specify, for example, that one of these messages be selected randomly as the message to be further used. Alternatively, the first metric may specify that, for example, the message received first be selected as the message to be further used. However, if errors occur in the transmission, the received messages will usually deviate from one another. With the aid of the first metric, the message can be detected from the messages received that most probably corresponds to the correct message or coincides most closely with the correct message.

According to a second variant, as an alternative to selecting one of the received messages, a subset of the received messages, or all the received messages, may be combined with one another. For example, the messages received by the two or more access points from the wireless terminal may be combined into a message to be further used in the communications network by means of a prespecified second metric. The combination of messages by means of the second metric may also occur, for example, with the aid of characteristics from error correction (for example, soft decision values of the error correction decoder) and/or radio frequency parameters of the receiver (for example, reception level). The combined message may then reflect the correct message with at least a high degree of probability. The second variant may be successfully used even if all received messages contain (different) errors.

At least one of the two or more access points may monitor the communications network for possible sources of interference (disrupters), in particular high-frequency disrupters. For example, in the case of data transmission in the uplink direction, at least one or more, for example, even all, of the access points monitor its respective reception channel and detect possible disrupters with reference to certain predetermined parameters. The disrupters may be intentional or unintentional disrupters. For example, the source of interference may be a defective network component in the communications network itself, such as a defective electronic device integrated into the network, or a defective electronic device brought on board the aircraft by a passenger (known as a passenger electronic device, or PED). The source of interference may also be an electronic device or communications device of another aircraft. In this context, the source of interference may, for example, be components of the wireless communications network of an aircraft located in the vicinity operating in a frequency range that at least overlaps, and possibly even coincides, with the frequency range of the communications network. It is also conceivable for the source of interference to be an electronic device that is part of the airport infrastructure. Moreover, devices that generate high-frequency interference signals for the purpose of disrupting the communications network (known as jammers) are also conceivable as sources of interference.

In the case of data transmission in the downlink direction, for example, for one or more of the access points currently not functioning as transmitters (not selected as transmitters) may function as receiver(s) and monitor the presence of interference signals. By the targeted analysis of one or more parameters, this access point or these access points may determine the probability of the presence of a disrupter. To this end, typical characteristics of interference signals may be used, such as changes to the receiver field intensity (for example, an abrupt or sudden change to the receiver field intensity), a signal duration typical of interference signals, or statistic characteristics typical of interference signals. Depending on the type of disrupter (interference source), interference signals may comprise, as features, a constant signal level (i.e., a signal level not subject to the typical variations of a regular transmitter) or unexpected level variations (i.e., sudden level changes in the middle of a data packet) or be sent at unexpected times (regular transmitters are allowed to send only at predetermined times). For example, interference detection may take into account the fact that the monitoring access point recognizes or is able to recognize the desired transmission signal.

Known disruptors or sources of interferences may, for example, be reported by the access point to the central computing unit such that the latter is able to introduce countermeasures at the system level. Alternatively or additionally, it is also possible for a detected disrupter to flow into the first and/or second metric which, as described above, are used to select the transmitter and/or to determine the receiving route. The computing unit may also instruct that a wireless terminal be assigned to one or more other access point(s) located in the receiving range whose communications connection shows no or less interference power. It is also possible, for example, when monitoring a disrupter with the aid of multiple access points, to localize the disrupter and initiate targeted countermeasures.

The invention further relates to a computer program having program code that, when loaded into a computer or a processor (for example, a microprocessor or microcontroller) or when running on a computer or processor (for example, a microprocessor or microcontroller), causes the computer or processor (for example, the microprocessor or microcontroller) to perform the method described above. In addition, the invention relates to a program storage medium or computer program product having the aforementioned computer program.

Even if some of the aspects of the invention described above were described with regard to network components or the control unit, these aspects can also be implemented as a method or as a computer program performing the method. Likewise, aspects of the invention described with regard to the method may be realized by means of suitable units in the network components and the control unit or be carried out by the computer program.

BRIEF DESCRIPTION OF THE DRAWINGS

Preferred embodiments of the present invention shall be described in the following with reference to the attached schematic figures, which show:

FIG. 6b a schematic representation of a section of the communications network from FIG. 1 in the performance of a method according to the third embodiment;

FIG. 8b a schematic representation of the communications network from FIG. 1 in the performance of the method according to the first or second embodiment and with a source of interference present.

DETAILED DESCRIPTION OF THE PREFERRED EMBODIMENTS

It is assumed in the following by way of example that the communications network shown in the figures and described below is a network in an aircraft. However, the communications network is not limited to this application, but may also be used in other means of transportation such as trains, buses, or ships.

Figure 1:
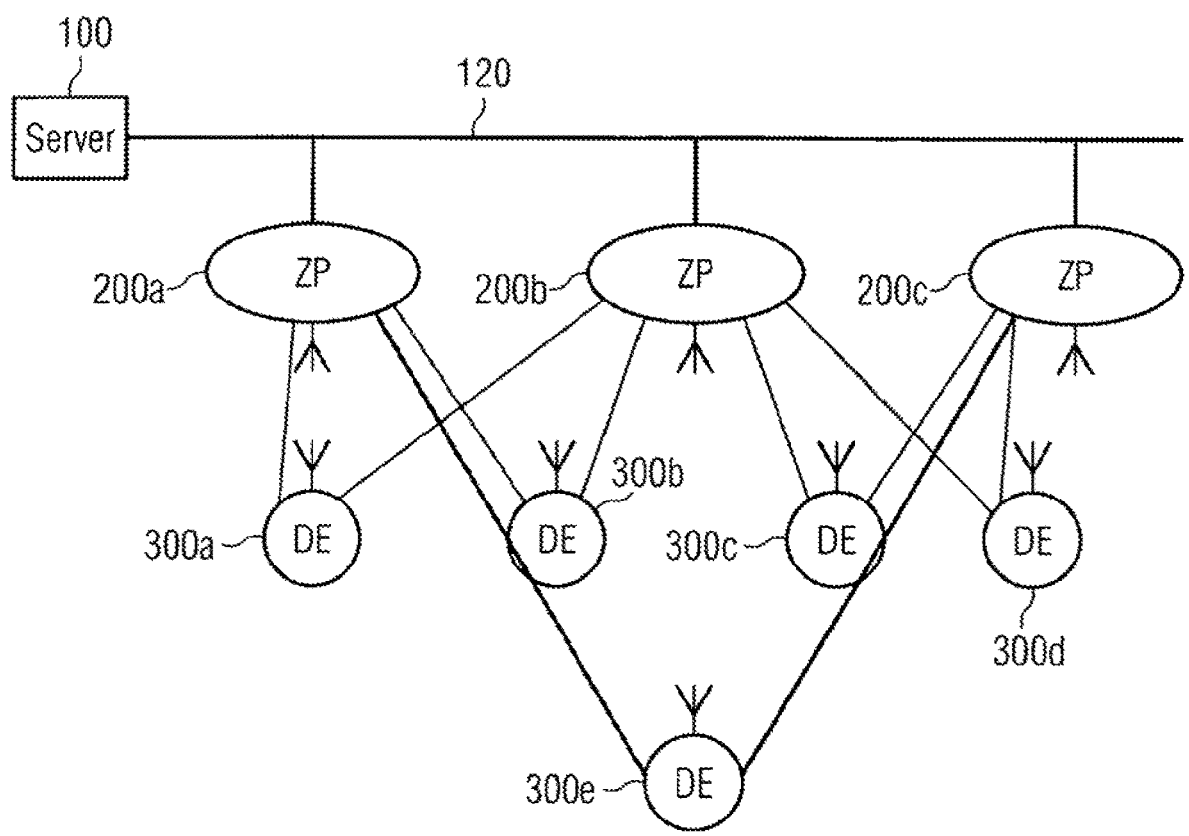
FIG. 1 a schematic representation of a network architecture of a wireless communications network for an aircraft.

FIG. 1 shows the network architecture of a wireless radio communications network for an aircraft as proposed herein.

The network components disposed in the communications network are a central computing unit (referred to below and in the figure as a server) 100, a plurality of access points (abbreviated in the figures as ZP) 200a, 200b, 200c, a plurality of wireless terminals (abbreviated in the figures as DE) 300a to 300e, as well as a wire-connected data bus 120 that connects the server 100 to each of the access points 200a, 200b, 200c. FIG. 1 shows three access points 200a, 200b, 200c by way of example; however any plurality of access points may be disposed in the communications network. Moreover, FIG. 1 shows five wireless terminals 300a to 300e by way of example; however, any plurality of wireless terminals may be disposed in the communications network.

The access points 200a, 200b, 200c produce the transition from the wire-connected data bus 120 to the wireless terminals 300a to 300e. Generally, each access point 200a, 200b, 200c may offer connection to multiple wireless terminals 300a to 300e. The wireless terminals may, for example, be sensor nodes or other electronic devices that are able to communicate in a wireless fashion with the server 100 or communicate with other devices or terminals via the server 100. Applications may run on the server 100 that require connections to the terminals 300a to 300e or realize connection queries of other devices (terminals) or other applications via the network. Moreover, applications may run on the server to which the wireless terminal 300a to 300e want access.

In the architecture shown in FIG. 1, each of the wireless terminals 300a to 300e is assigned to exactly two access points 200a, 200b, 200c by way of example. This means, for example, that the wireless terminal 300a is not only assigned to the access point 200a but also to the access point 200b. The same applies for the wireless terminal 300b. Thus, according to the architecture shown in FIG. 1, it is possible for some of the wireless terminals 300a to 300e to be associated with the same access points 200a, 200b, 200c. Furthermore, it may be seen in FIG. 1 that the wireless terminal 300c and the wireless terminal 300d are associated with the access point 200b as well as with the access point 200c. Finally, the wireless terminal 300e is assigned to the access point 200a as well as with the access point 200c. Although each of the wireless terminals is assigned by way of example in FIG. 1 to exactly two access points, device association is not limited to this example. Each of the wireless terminals 300a to 300e may also be assigned to more than two, for example, three, four, five, six, or more than six access points as long as the condition is met that the wireless terminal is assigned to at least two access points 200a, 200b, 200c. All of the wireless terminals 300a to 300e in the network need not be assigned the same number of access points 200a, 200b, 200c. Thus, deviating from FIG. 1, it is also possible for the wireless terminal 300a to be assigned to two access points, for example, access points 300a and 200b, but for the wireless terminal 300b to be assigned to more than two (for example, three) access points, such as the access points 200a, 200b, 200c.

If, for example, data are now to be transmitted from the server 100 to the wireless terminal 300a (i.e., in the so-called downlink direction), either of the access points 200a, 200b assigned to the wireless terminal 300a may, in principle, assume the wireless transfer of the data. However, dual channel capacity would normally be necessary in this case because the data are transmitted on different frequencies (in the case of a frequency multiplex method such as FDMA) or different time slots (in the case of a time multiplex method such as TDMA) or with different codes (in the case of a code multiplex method such as CDMA). As an alternative to transmission via each of the access points (200a, 200b), a control unit described in greater detail below is used to select one of the two access points 200a, 200b for data transmission to the wireless terminal 300a.

On the other hand, if data are to be transmitted, for example, from the wireless terminal 300a to the server 100 (i.e., in the so-called uplink direction), the data are transmitted to both of the access points 200a, 200b assigned to the wireless terminal 300a. However, both of the messages received by the access points 200a, 200b are not forwarded to the server 100; rather, the control unit described in greater detail below derives/determines a message to be forwarded to the server 100 from the received messages.

Figure 2:
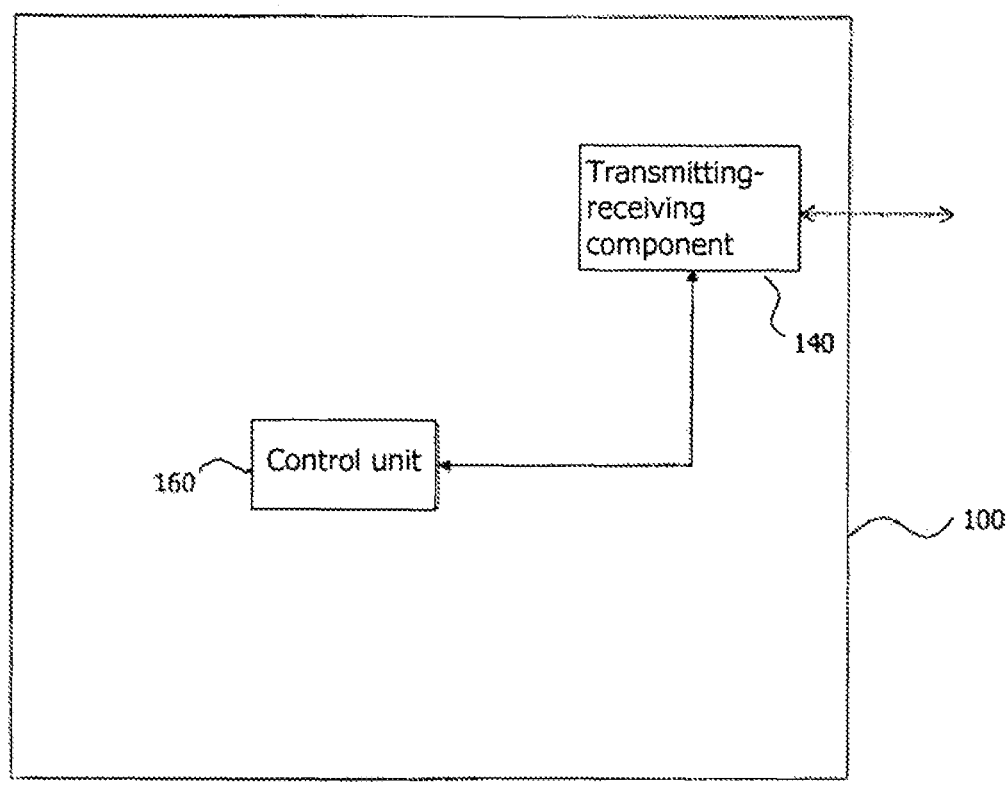
FIG. 2 a schematic representation of one embodiment of a control unit that may be used in the communications network from FIG. 1.

FIG. 2 shows a possible arrangement of this control unit 160 in the communications network from FIG. 1. According to the exemplary arrangement according to FIG. 2, the control unit 160 is disposed in the server 100. Alternatively, however, it is also possible for the control unit 160 to be disposed in a decentralized fashion between the access points 200a, 200b, 200c or to distribute it over a subset or over all of the access points 200a, 200b, 200c as logical components.

As may be seen in FIG. 2, the server 100 comprises a transmitting-receiving component 140 with which the server 100 may receive data from the data bus 120 in a wire-connected fashion and with which the server 100 may transmit data via the data bus 120 in a wire-connected fashion. The transmitting-receiving component 140 is connected to the control unit 160 such that the transmitting-receiving component 140 is able to forward received data to the control unit 160 and such that the control unit 160 is able to relay data to the transmitting-receiving component 140 for transmission via the transmitting-receiving unit 140.

Independently of the exact arrangement of the control unit 160 in the communications network 100, the control unit 160 selects one of the two access points 200a, 200b for the transmission of data to the wireless terminal 300a. According to a first implementation, it is possible for the control unit 160 to instruct the server 100 via the transmitting-receiving component 140 and the data bus 120 to transmit the data to be transmitted only to the selected access point. According to a second implementation, it is possible for the server 100 to transmit the data to be transmitted via the transmitting-receiving component 140 and the data bus 120 to both access points 200a, 200b assigned to the wireless terminal 300a and for only the access point ultimately selected by the control unit 160 to transmit the data to the wireless terminal 300a. If, for example, it is assumed that the control unit 160 selects the access point 200a for data transmission, this access point transmits the data to be transmitted in a wireless fashion to the wireless terminal 300a in the downlink direction.

Figure 3:
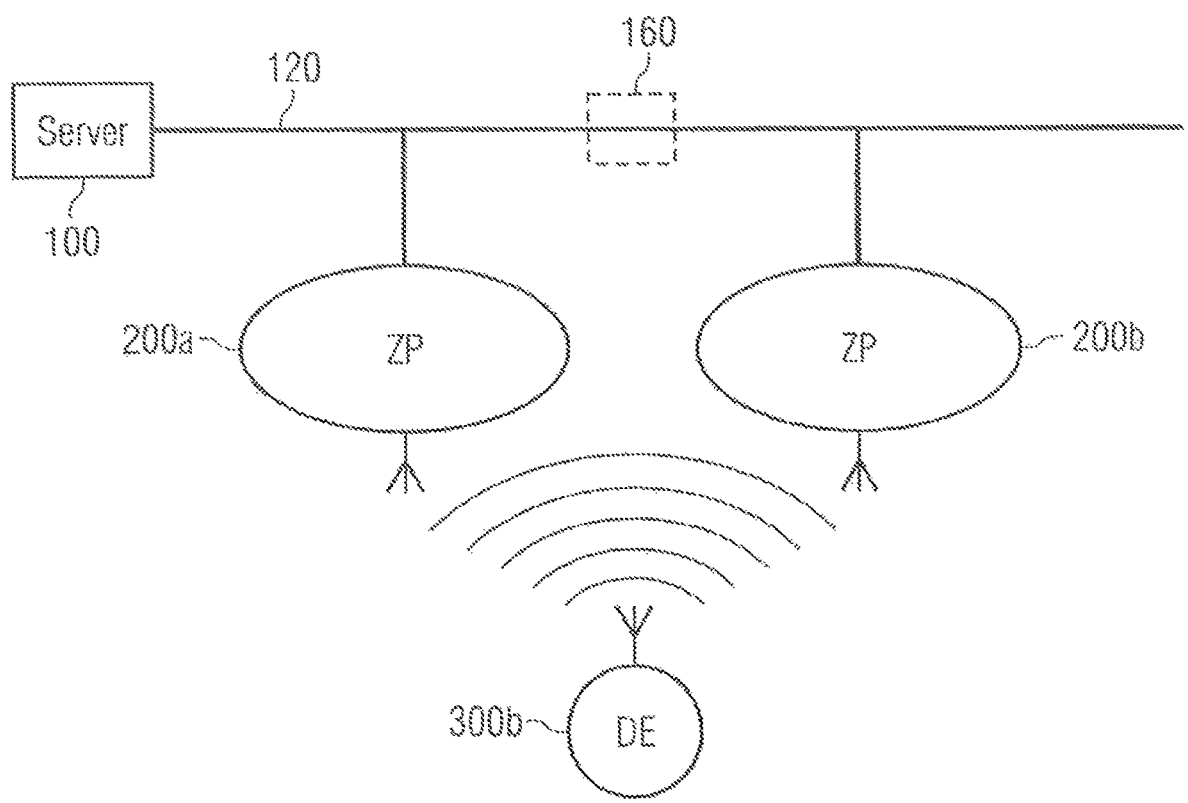
FIG. 3 a schematic representation of a section of the communications network from FIG. 1 in the performance of a method according to a first or second embodiment.

FIG. 3 shows a section of the communications network from FIG. 1. For simplicity's sake, this section shows only the server 100, the data bus 120, two access points 200a, 200b, and a wireless terminal 300b, which is assigned to the two access points 200a, 200b. In the example shown in FIG. 3 the server 100 is designed like the server shown in FIG. 2, i.e., the server 100 comprises the control unit 160. Alternatively, it is also possible for a conventional server without a control unit 160 to be provided and for the control unit 160 to be arranged in a decentralized fashion between the access points 200a, 200b and connected to the data bus 120, as is implied by the dashed lines in FIG. 3. FIG. 3 depicts the case in which data transmission occurs in the uplink direction, i.e., from the wireless terminal 300b to the access points 200a, 200b. Two embodiments of a method for controlling (or coordinating) this wireless data transmission in the uplink direction are shown as flowcharts in FIGS. 4 and 5.

Figure 4:
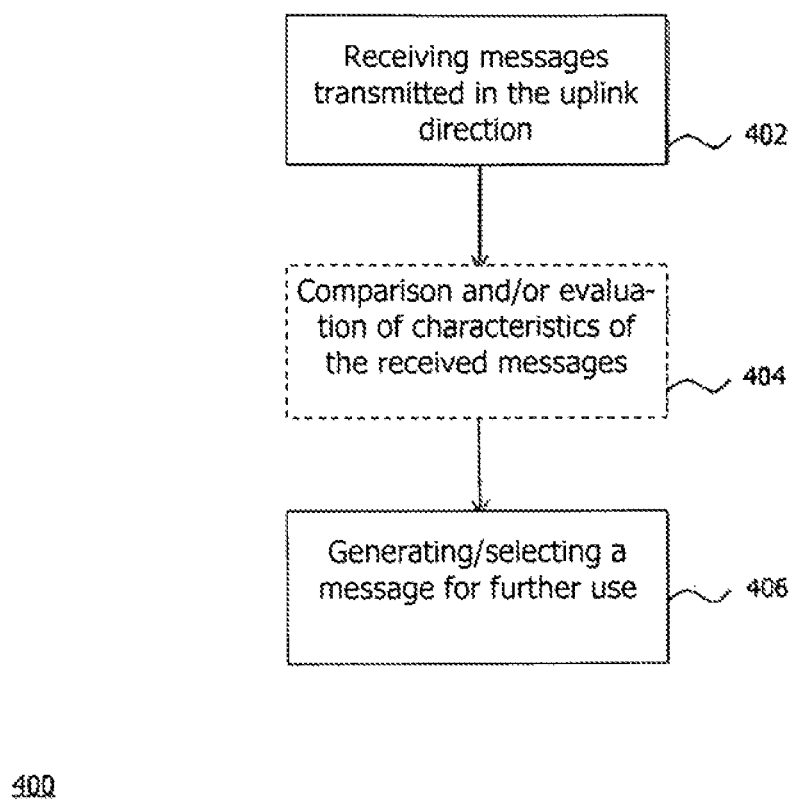
FIG. 4 a flowchart of the method according to the first embodiment.

A first embodiment of a method for controlling (coordinating) the wireless data transmission in the uplink direction is shown in FIG. 4. If a message (one and the same message) is transmitted by a wireless terminal 300b in the uplink direction to the access point 200a as well as to the access point 200b, then both of these access points 200a, 200b receive the message via their respective assigned communications channels to the wireless terminal in step 402. It is possible for one or both of the communications channels from the wireless terminal to the access points to be free of interference and, correspondingly, for one or both of the access points to correctly receive the message. However, it is also possible for errors to occur in the transmission and for one or both access points 200a, 200b to receive faulty messages. It is moreover possible for both transmission channels from the wireless terminal 300b to the access points 200a, 200b to experience interferences of different strengths, i.e., for different errors to occur in the two transmission channels.

A logic present in the control unit 160 then decides, independently of whether the control unit 160 is centrally located in the server 100 or provided in a decentralized fashion between the access points 200a, 200b, which of the received messages should be further used. To this end, the logic compares characteristics of each of the received messages in step 404 to a first metric and determines based on said comparison which of the received messages will be further used. For example, it is possible for the logic to select and further use in step 406 one of the received messages as more likely to have been correctly received or to have fewer errors based on the comparison. The selected message may, for example, be further used in that it is forwarded to the server 100 and evaluated there or transmitted by the server 100 to another wireless terminal. As is implied by dashed lines in FIG. 4, step 404 is only optional and may therefore be omitted. Thus, for example, initially only step 402 may be carried out in that the messages from the access points 200a, 200b are received. Subsequently, the control unit 160 may determine, for example, randomly, which of the received messages should be further used.

Figure 5:
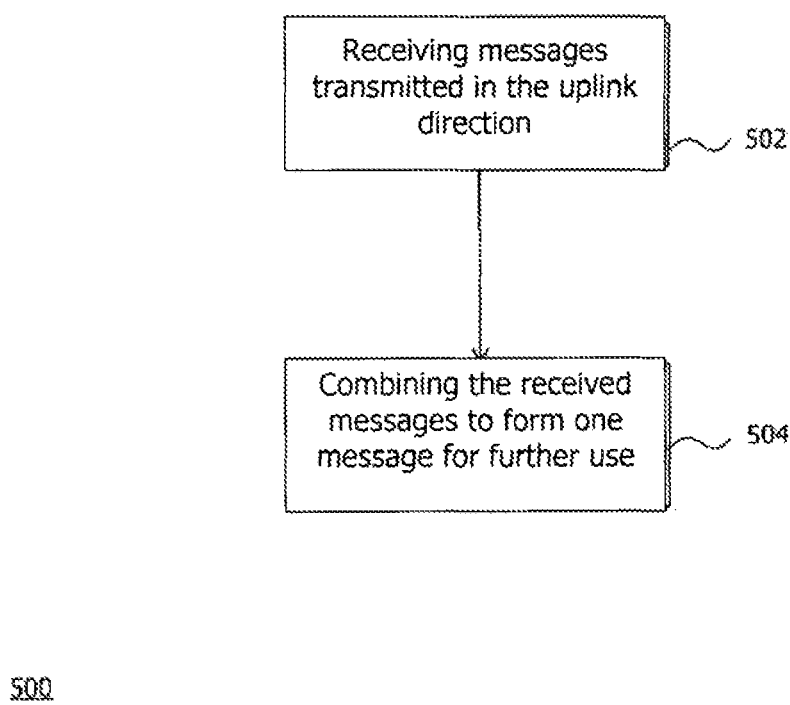
FIG. 5 a flowchart of the method according to the second embodiment.

A second embodiment of a method for controlling the data transmission in the uplink direction is shown in FIG. 5. According to this embodiment, the wireless terminal 300b transmits a message in the uplink direction respectively via a communications channel to the access point 200a and to the access point 200b. The messages received by the access points 200a, 200b in step 502 are combined by the control unit 160 according to a second metric (step 504) independently of whether the control unit 160 is located in the server 100 or disposed in a decentralized fashion between the access points 200a, 200b. The combination of the received messages then indicates the correct message with a high degree of probability or, in particular, precisely.

Figure 6A:
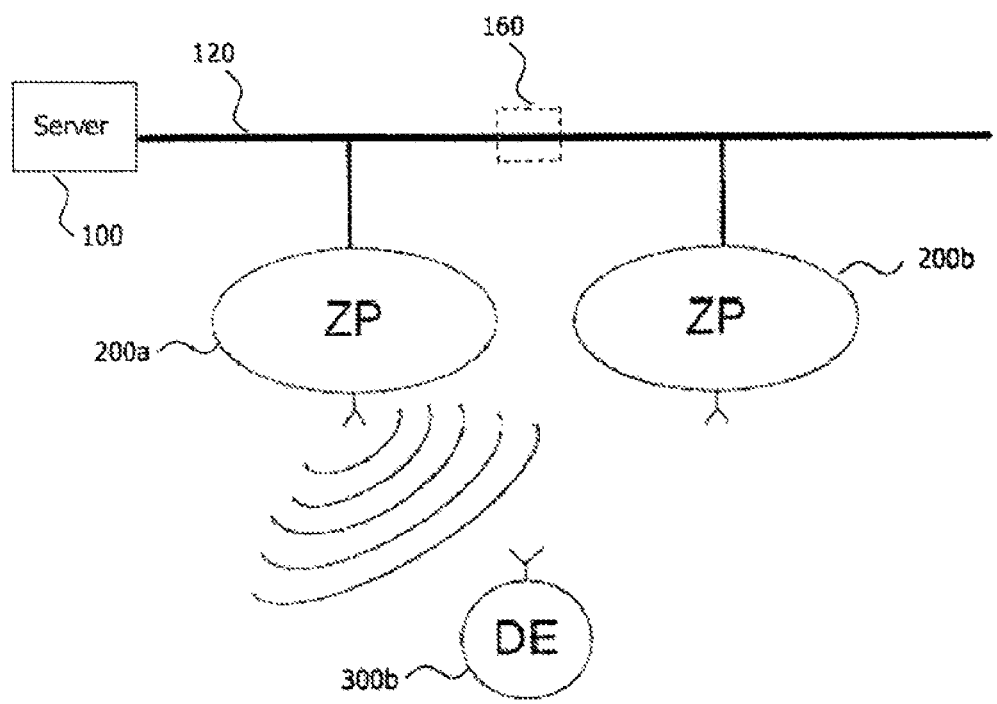
FIG. 6a a schematic representation of a section of the communications network from FIG. 1 in the performance of a method according to a third embodiment.

FIGS. 6a and 6b each show the same section of the communications network from FIG. 1 with the server 100, the data bus 120, the two access points 200a, 200b, and the wireless terminal 300b assigned to the two access points 200a, 200b. As an alternative to being disposed in the server 100, the control unit 160 may also be disposed between the access points 200a, 200b or (logically) distributed on the access points 200a, 200b. As illustrated in FIGS. 6a and 6b, either the access point 200a (FIG. 6a) or the access point 200b (FIG. 6b) transmits data in the downlink direction to the wireless terminal 300b. These data may, for example, originate from the server 100 or from another wireless terminal.

Figure 7:
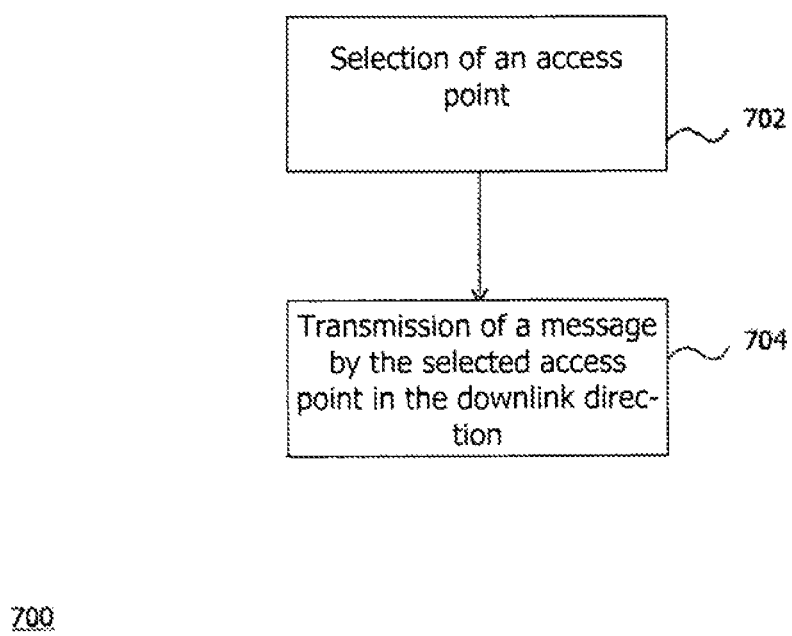
FIG. 7 a flowchart of the method according to the third embodiment.

FIG. 7 schematically shows a flowchart of the method according to the third embodiment for data transmission in the downlink direction.

For example, the server 100 wishes to transmit a message to the wireless terminal 300b. Alternatively, another wireless terminal wishes to transmit data to the wireless terminal 300b via the server 100. Independently of whether the original message originates from the server 100 or from another wireless terminal, the message is conducted from the server to the access point 200a and the access point 200b via the data bus 120 in a wired fashion. In step 702, the decision is then made as to which of the access points 200a, 200b should transmit the message to the wireless terminal 300b in a wireless fashion. The selection may, for example, be performed at random.

According to the embodiment assumed by way of example, however, the selection is not made at random, but rather takes into account information regarding the respective transmission channel between the two access points 200a, 200b and the wireless terminal 300b. Using this information, the transmission channel that is likely to be better can be selected. This information may be derived from previously conducted transmissions in the downlink and/or uplink direction between the access points 200a, 200b and the wireless terminal 300b. Alternatively or additionally, the information may take into account one or more channel measurements or channel evaluations conducted prior to transmission in which a test message is exchanged in the uplink and/or downlink direction between the access points 200a, 200b and the wireless terminal 300b. Alternatively or additionally, the information may take into account the current load in the entire network or in a region of the network, for example, in the region around the access points 200*a*, 200*b* and the wireless terminal 300*b*. After the selection of the access point that is anticipated to have the better transmission channel to the wireless terminal 300*b*, a message is transmitted from the selected access point in the downlink direction (step 704). FIG. 6*a* shows by way of example that the access point 200*a* transmits the message to the wireless terminal 300*b* because it was selected in step 702. FIG. 6*b* shows by way of example how the access point 200*b* was selected in step 702 due to a better transmission channel to the wireless terminal 300*b* and accordingly transmits the message in step 704.

It is conceivable for the access point 200*a* to be initially selected in step 702 and, as shown in FIG. 6*a*, to transmit the message to the wireless terminal 300*b*. If any transmission errors occur in this transmission that, for example, makes the further use of the received message impossible, one of the two access points 200*a*, 200*b* is selected again in step 702. If, for example, the access point 200*b* is now selected, then this access point retransmits the message to the wireless terminal 300*b*, as is shown in FIG. 6*b*. After a successful transmission of the message, the method ends and can be conducted again for a new message. If an error occurs again, steps 702 and 704 may then be repeated as long as is necessary for the transmission to be successful.

Figure 8A:
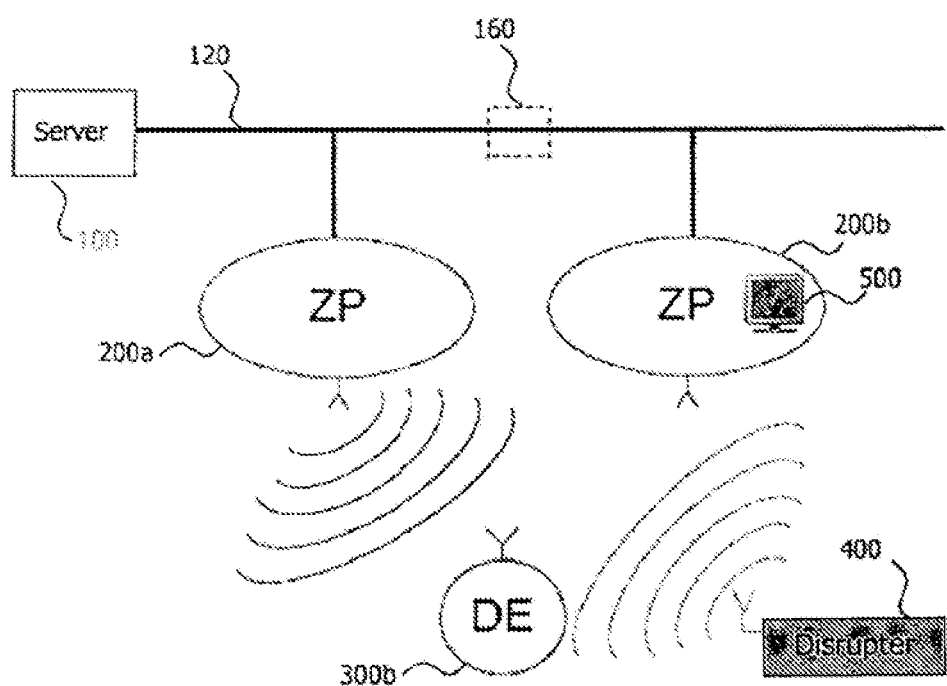
FIG. 8a a schematic representation of a section of the communications network from FIG. 1 in the performance of the method according to the third embodiment and a with a source of interference present.

FIGS. 8*a* and 8*b* show situations in which a disrupter 400 influences transmission in the uplink direction (FIG. 8*b*) and in the downlink direction (FIG. 8*a*). According to FIG. 8*a*, for example, the access point 200*a* transmits a message to the wireless terminal 300*b* because the access point 200*a* was selected for data transmission in step 702. The disruptor 400 at least impedes or possibly even prevents the successful transmission of the message. In order to prevent this, the access point 200*b* comprises a monitoring component 500 by means of which it is able to monitor radio signals. The access point 200*a* also comprises such a monitoring component; however, it is not currently active because it is already transmitting the message to the wireless terminal 300*b*. This means that the access point that is not currently functioning as the transmitter is able to monitor the radio signal with the aid of its monitoring component 500. By evaluating one or more parameters in a targeted manner, the access point 200*b* is able to calculate the probability of the presence of a disrupter 400. To this end, it is able to use typical characteristics of interference signals such as, for example, changes to the receiver field intensity typical of interference signals (such as a sudden change to the receiver field intensity), a signal duration typical of interference signals, or statistic characteristics typical of interference signals. It is conceivable, for example, that the access point 200*b* initially received no signal or only a signal with a low receiver field intensity. If a sudden, high-frequency disruption occurs due to the disruptor 400, the field intensity received by the access point 200*b* changes abruptly. The access point 200*b* can then conclude from this that a disruptor is located in its surroundings or in the range or in the surroundings of the communications network. Signals transmitted by disrupters 400 also usually have different static characteristics from signals for the transmission of a message.

A disrupter 400 recognized by the access point 200*b* is reported to the server 100, which is then able to initiate countermeasures on the system level. The server 100 may also use the information received with regard to the disrupter 400 to calculate the first metric and/or the second metric for selecting the access point or for selecting the best receiving route. The control unit 160 may also instruct that the wireless terminal 300*b* be assigned to another access point located within the receiving range, for example, the access point 200*c*, that is farther removed from the source of the interference or is experiencing less interference from the disrupter. If a plurality of access points is monitoring the communications network for potential disrupters 400 with the aid of their monitoring components 500, then the server is able to localize the disrupter 400 using the information transmitted to it by the access points and accordingly take more targeted countermeasures.

FIG. 8*b* illustrates the presence of a disrupter 400 during a data transmission in the uplink direction. During transmission in the uplink direction, for example, the access point 200*b* may also monitor its surroundings with the aid of its monitoring component 500 as is described with regard to the downlink direction. For example, the access point 200*b* may monitor the receiving channel in question for interference in order to recognize possible disrupters 400 using the received signals by evaluating the parameters mentioned above, as described above. In this case, for example, the access point 200*b* may, in monitoring mode, suspend receipt of the message transmitted by the wireless terminal 300*b* and only continue receipt when it is no longer in monitoring mode. Alternatively, however, the access point 200*b* may also receive data from the wireless terminal 300*b* even during monitoring mode for detecting possible disruptors 400.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A control unit for controlling a wireless data transmission between a wireless terminal and access points of a communications network provided in an aircraft, the communication network comprising the wireless terminal, the access points, and a central computing unit connected in a wired fashion to the access points, wherein the central computing unit, the access points, and the wireless terminal are each provided in the aircraft, with the wireless terminal being assigned to two or more of the access points in such a way that a communications channel for the wireless transmission of data is respectively available between the wireless terminal and the two or more access points, wherein the control unit is configured to:

in the case of a data transmission from the two or more assigned access points in the direction of the wireless terminal, select at least one of the two or more access points for the wireless data transmission to the wireless terminal, wherein the wireless terminal is provided in the aircraft and comprises one or more of a sensor, a sensor node, an actuator, or a data recorder; and in the case of a data transmission of a transmitted message from the wireless terminal in the direction of the two or more assigned access points, each of the two or more assigned access points receives a received message corresponding to the transmitted message, and after the received messages have been received by the two or more assigned access points, select one of the received messages as a message to be further used in the communications network based on a comparison of the messages received over a respective receiving channel by each of the two or more assigned access points with a predetermined first metric, wherein each of the two or more assigned access points monitors radio signals for interference in the respective receiving channels between the wireless terminal and each of the two or more assigned access points to recognize a possible disrupter that is a source of the interference;

wherein the predetermined first metric is based on whether the disrupter is recognized by the at least one of the assigned two or more access points.

2. The control unit according to claim 1, wherein, in the case of data transmission from the two or more access points in the direction of the wireless terminal, the control unit is configured to select one access point out of the two or more access points based on information regarding the respective communications channel between the two or more access points and the wireless terminal for the transmission of a message from the selected access point to the wireless terminal.

3. The control unit according to claim 1, wherein the control unit is one of:
contained in the central computing unit,
disposed between the two or more access points, and
distributed as a logical component over the two or more access points.

4. The control unit according to claim 1, wherein the transmitted message and the received messages differ only due to transmission errors from the data transmission of a transmitted message from the wireless terminal in the direction of the two or more access points.

5. The control unit according to claim 1, wherein, when the received messages are identical, the message to be further used is selected randomly.

6. A method for controlling a wireless data transmission between a wireless terminal and access points of a communications network provided in an aircraft, the communication network comprising the wireless terminal, the access points, and a central computing unit connected in a wired fashion to the access points, wherein the central computing unit, the access points, and the wireless terminal are each provided in the aircraft, with the wireless terminal being assigned to two or more of the access points in such a way that a communications channel is respectively available between the wireless terminal and the two or more access points, comprising:
in the case of a data transmission from the two or more assigned access points in the direction of the wireless terminal, selecting at least one of the two or more assigned access points by means of a control unit for the wireless data transmission to the wireless terminal, wherein the wireless terminal is provided in the aircraft and comprises one or more of a sensor, a sensor node, an actuator, or a data recorder; and
in the case of a data transmission of a transmitted message from the wireless terminal in the direction of the two or more assigned access points such that each of the two or more assigned access points receives a received message corresponding to the transmitted message, comparing characteristics of the messages received over a respective receiving channel by each of the two or more assigned access points to a predetermined first metric: and
after the received messages have been received by the assigned two or more access points, selecting one of the received messages as a message to be further used in the communications network based on the comparison to the predetermined first metric, wherein each of the two or more assigned access points monitors radio signals for interference in the respective receiving channels between the wireless terminal and each of the assigned two or more access points to recognize a possible disrupter that is a source of the interference, wherein the predetermined first metric is based on whether the disrupter is recognized by the at least one of the assigned two or more access points.

7. The method according to claim 6, wherein, in the case of a data transmission from the two or more access points in the direction of the wireless terminal, the method further comprises the following steps:
selecting by means of the control unit an access point from the two or more access points based on information regarding the respective communications channel between the two or more access points and the wireless terminal; and
transmitting a message from the selected access point to the wireless terminal.

8. The method according to claim 7, wherein the information regarding the respective communications channel between the two or more access points and the wireless terminal is derived from at least one of:
prior regular data transmissions between the two or more access points and the wireless terminal; and
at least one channel measurement or channel evaluation of the respective communications channel between the two or more access points and the wireless terminal conducted earlier; and
the present load in the communications network.

9. The method according to claim 7, wherein, in the case of an unsuccessful transmission of the message from the selected access point to the wireless terminal, the step of selecting the access point is performed again.

10. The method according to claim 7, wherein the selecting step comprises selecting the message whose characteristics coincide more precisely with the predetermined first metric.

11. The method according to claim 7, wherein, in order to detect the disrupters, one of the two or more access points investigates its receiving signal for parameters typical of interference signals, such as changes in the receiving field intensity typical of interference signals, signal durations typical of interference signals, or static properties typical of interference signals.

12. The method according to claim 7, wherein the association between the wireless terminal and the two or more access points is fixed or changeable.

13. The method according to claim 6, further comprising:
forwarding the message to be further used in the communications network to the central computing unit.

14. A non-transitory program storage medium having a computer program having computer-executable instructions, which, when loaded into a computer or processor or running on a computer or processor, causes the computer or processor to execute the instructions to:
control a wireless data transmission between a wireless terminal and access points of a communications network provided in an aircraft, the communication network comprising the wireless terminal, the access points, and a central computing unit connected in a wired fashion to the access points, wherein the central computing unit, the access points, and the wireless terminal are each provided in the aircraft, with the wireless terminal being assigned to two or more of the access points in such a way that a communications channel for the wireless transmission of data is respectively available between the wireless terminal and the two or more access points, wherein the wireless terminal is provided in the aircraft and comprises one or more of a sensor, a sensor node, an actuator, or a data recorder, and wherein the control unit is configured to:

in the case of a data transmission from the assigned two or more access points in the direction of the wireless terminal, select at least one of the assigned two or more access points for the wireless data transmission to the wireless terminal; and in the case of a data transmission of a transmitted message from the wireless terminal in the direction of the assigned two or more access points, each of the assigned two or more access points receives a received message corresponding to the transmitted message, and after the received messages have been received by the assigned two or more access points, select one of the received messages as a message to be further used in the communications network based on a comparison of the messages received over a respective communication channel by each of the two or more assigned access points with a predetermined first metric, wherein each of the assigned two or more access points monitors radio signals for interference in the respective receiving channels between the wireless terminal and each of the assigned two or more access points to recognize a possible disrupter that is a source of the interference;

wherein the predetermined first metric is based on whether the disrupter is recognized by the at least one of the assigned two or more access points.

* * * * *